United States Patent
Bhogal et al.

(10) Patent No.: US 7,711,777 B2
(45) Date of Patent: May 4, 2010

(54) METHOD AND SYSTEM FOR MANAGING A REMOTE CONTROL SESSION

(75) Inventors: Kulvir Singh Bhogal, Fort Worth, TX (US); Gregory Jensen Boss, American Fork, UT (US); Rick Allen Hamilton, II, Charlottesville, VA (US); Alexandre Polozoff, Bloomington, IL (US)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 11/690,490

(22) Filed: Mar. 23, 2007

(65) Prior Publication Data

US 2008/0235596 A1 Sep. 25, 2008

(51) Int. Cl.
 G06F 15/16 (2006.01)
 G06F 3/00 (2006.01)
(52) U.S. Cl. ...................................... 709/205; 715/755
(58) Field of Classification Search ................. 709/204, 709/205; 715/755
 See application file for complete search history.

(56) References Cited

U.S. PATENT DOCUMENTS

| | | | |
|---|---|---|---|
| 5,838,300 A | 11/1998 | Takagi et al. | |
| 6,542,164 B2 | 4/2003 | Graham | |
| 6,686,933 B1 | 2/2004 | Tang et al. | |
| 6,865,719 B1 | 3/2005 | Nicholas, III | |
| 6,889,365 B2 | 5/2005 | Okahara et al. | |
| 2004/0174830 A1* | 9/2004 | Koskelainen et al. | 370/260 |
| 2006/0020665 A1 | 1/2006 | Hagale et al. | |

OTHER PUBLICATIONS

Greenberg, S. "Sharing Views and interactions with single-user applications" Proceedings of the ACM SIGOIS, 1990, pp. 227-237.*
Vogt, et al.; Exploring Collaboration with Group Pointer Interaction; IEEE Computer Society; Proceedings of the Computer Graphics International (CGI'04); 1530-1052/04; 4 pages.
Ha, et al.; Direct Intentions: The Effects of Input Devices on Collaboration around a Tabletop Display; IEEE Computer Society; Proceedings of the First IEEE International Workshop on Horizontal Interactive Human-Computer Systems (Tabletop '06); 0-7695-2494-X/05; 8 pages.

* cited by examiner

Primary Examiner—David Lazaro
(74) Attorney, Agent, or Firm—Schmeiser, Olsen & Watts; William E. Schiesser (57) ABSTRACT

A method and system for managing a remote control session (RCS) during which control of input mechanisms of authorized users for manipulating a shared computer screen is time-sliced among the authorized users. No more than one authorized user has control of the input mechanisms at each time during the RCS. Each authorized user is able to view the shared portion of the computer screen throughout the RCS and has been assigned a priority, a control time slice (CTS), and an inactivity threshold. Sole control of the input mechanisms is provided to a first authorized user who requested control of the input mechanisms. Sole control of the input mechanisms is transferred from the first authorized user to a second authorized user who requested control of the input mechanisms. The first and second authorized user are each scheduled to have sole control of the input mechanisms for a specified time duration.

32 Claims, 5 Drawing Sheets

| QUEUE POSITION 1→ | USER ID 2→ | PRIORITY 3→ | REQUESTED CONTROL? 4→ | TIME REMAIN. (SEC) 5→ | AUTH. PERIOD (SEC) 6→ | TIME UNTIL CTRL INPUT (SEC) 7→ | TIME SINCE REQ. CTRL (SEC) 8→ | INACTIVITY THRESHOLD (SEC) 9→ | INACTIVITY TIME (SEC) 10→ |
|---|---|---|---|---|---|---|---|---|---|
| 1 | JACK | 3 | YES | 9 | 15 | 0 | 52 | 10 | 3 |
| 2 | GREG | 2 | YES |  | 15 | 9 | 40 | 10 |  |
| 3 | RICK | 2 | YES |  | 30 | 24 | 33 | 15 |  |
| 4 | BOB | 3 | YES |  | 15 | 54 | 28 | 10 |  |
| 5 | BETH | 2 | NO |  | 30 |  |  | 15 |  |
| 6 | AMY | 1 | NO |  | 15 |  |  | 10 |  |
| 7 | LOU | 4 | NO |  | 15 |  |  | 10 |  |
| 8 | ELLEN | 5 | NO |  | 30 |  |  | 15 |  |

METHOD AND SYSTEM FOR MANAGING A REMOTE CONTROL SESSION

FIELD OF THE INVENTION

A method and system for managing a remote control session.

BACKGROUND OF THE INVENTION

Remote control software has historically been used by people with computer administrative functions and also those with deep technical backgrounds. However, increasingly, remote control software is being used by "average" computer users, especially when those users have routine access to more than one computer, or travel away from the office and still need access to the machines that may reside there. Furthermore, aiding the proliferation of these programs, help desks and major computer manufacturers are now including remote control software as a default installed program to assist with problem determination and solutions. This type of software can be extremely beneficial for fixing problems quickly and accurately, accessing remote files and programs otherwise not available, and helping to train geographically disparate users.

Remote control software may allow two or more users to share a screen. When two or more users are sharing control of a screen, however, significant confusion is often generated due to the conflicting actions of the users' input devices. Consider two users denoted as a Local User and a Remote User. When the Remote User moves the mouse of the Local User's screen at the same time the Local User is moving the mouse, both users will see very odd and unexpected behavior. For example, the Remote User may click on a first window and begin dragging the first window to a new location, while the Local User is moving the mouse to another area of the screen to activate a second program. The movements of both users are registered with the computer and the first window will jump sporadically back and forth between the two conflicting mouse movements. At other times, it is common for one user to be typing in a word processor, or programming development environment while the Remote User needs to simply move the mouse away from the remote control screen into another window that is local to the Remote User, but the Remote User has no way of transferring the Remote User's own local mouse outside of the remote control window without registering that movement with the Local User's computer. The simple act of moving the mouse will almost always result in a focus change of windows in the remote control session and thus interrupt the Local User's input in the previous window which had focus. The effects can sometimes be more than inconvenient when such a movement or change in focus launches an unintended program, deletes a file, or makes some other unexpected change.

A current implementation of remote control software disables all screen access except for access by one user. This implementation has the disadvantage that once a first user grants control to a second user, the first user cannot regain control until the second user gives up control voluntarily.

There are no known solutions to these problems. Remote control and session-sharing software packages generally exhibit this problematic behavior and condition. Unfortunately, both users must endure the situation, or one user needs to be patient and physically watch the screen, determine or guess when the other user is not using the mouse or taking any action, and then to take control of the cursor.

Thus, there is a need for a remote control session method and system that alleviates at least one of the aforementioned problems.

SUMMARY OF THE INVENTION

The present invention provides a method for managing a remote control session (RCS) during which control of input mechanisms of a plurality of authorized users for manipulating a shared computer screen is time-sliced among the authorized users such that no more than one authorized user of the plurality of authorized users has control of the input mechanisms at each time during the RCS, said method comprising:

initiating the RCS during which the authorized users are coupled to the RCS via a communication network, wherein each authorized user has been assigned a priority, a control time slice (CTS), and an inactivity threshold, and wherein said initializing comprises enabling each authorized user to view the shared portion of the computer screen throughout the RCS;

providing sole control of the input mechanisms to a first authorized user who requested control of the input mechanisms, wherein the sole control of the input mechanisms by the first authorized user is configured to be effective for no more than a first duration that is equal to the CTS assigned to the first authorized user; and transferring sole control of the input mechanisms from the first authorized user to a second authorized user who requested control of the input mechanisms, wherein the sole control of the input mechanisms by the second authorized user is configured to be effective for no more than a second duration that is equal to the CTS assigned to the second authorized user, wherein said initiating the RCS, said transferring sole control of the input mechanisms to the first authorized user, and said transferring sole control of the input mechanisms to the first authorized user are performed by program code while executing on a processor of a computer system that is coupled to the communication network.

The present invention provides a process for integrating computing infrastructure, said process comprising integrating computer-readable code into a computer system that is coupled to the communication network, wherein the code in combination with the computer system is capable of performing a method for managing a remote control session (RCS) during which control of input mechanisms of a plurality of authorized users for manipulating a shared computer screen is time-sliced among the authorized users such that no more than one authorized user of the plurality of authorized users has control of the input mechanisms at each time during the RCS, said method comprising:

initiating the RCS during which the authorized users are coupled to the RCS via a communication network, wherein each authorized user has been assigned a priority, a control time slice (CTS), and an inactivity threshold, and wherein said initializing comprises enabling each authorized user to view the shared portion of the computer screen throughout the RCS;

providing sole control of the input mechanisms to a first authorized user who requested control of the input mechanisms, wherein the sole control of the input mechanisms by the first authorized user is configured to be effective for no more than a first duration that is equal to the CTS assigned to the first authorized user; and transferring sole control of the input mechanisms from the first authorized user to a second authorized user who requested control of the input mechanisms, wherein the sole control of the input mechanisms by the second authorized user is configured to be effective for no more than a second duration that is equal to the CTS assigned to the second authorized user, wherein said initiating the RCS, said transferring sole control of the input mechanisms to the first authorized user, and said transferring sole control of the input mechanisms to the first authorized user are performed by program code while executing on a processor of the computer system.

The present invention provides a method and system that overcomes at least of the disadvantages in existing remote control software.

DETAILED DESCRIPTION OF THE INVENTION

This present invention provides a method and system for managing a remote control session (RCS or "session") in which control of the input mechanisms (keyboard, mouse, light pen, etc.) of a plurality of authorized users is time-sliced among the authorized users. The input mechanisms manipulate a computer screen or a portion thereof. Therefore, the only user who can manipulate the computer screen or the portion thereof at any time during the RCS is the authorized user. Accordingly, once control of a session is given or transferred to one user, control of the session stays with the one user for some period of time or until a condition for ending control of the session by the one user is triggered. Priority of users are also implemented so that some users, based upon user preference or current activity or some similar metric, are prioritized above or below all other users. This prioritization influences assignment of control of the input mechanism to users appropriately. In one embodiment, an owner of a computer may be assigned a greater priority than that of all other users so as to have an ability to have the owner's input actions take precedence over all other users' input actions. In one embodiment, a sufficiently experienced user (e.g., a remote person who is assisting in finding or fixing a problem or teaching a skill) may be assigned a greater priority than that of the owner or local users.

Another aspect of the invention is an improved method to show multiple pointers of authorized controllers of a session all session users (i.e., authorized users and viewer users) who would see multiple pointers corresponding to each authorized user's input device actions. Authorized users are those session users who have authority to take control of the RCS, whereas viewers are those session users who are logged into the session but who have viewing rights only. For example, in a session of 5 viewers and 2 authorized users, all 7 users would see the mouse movements of the 2 users, which promotes a logical and cohesive view of what actions are being taken by each authorized user.

Figure 1:
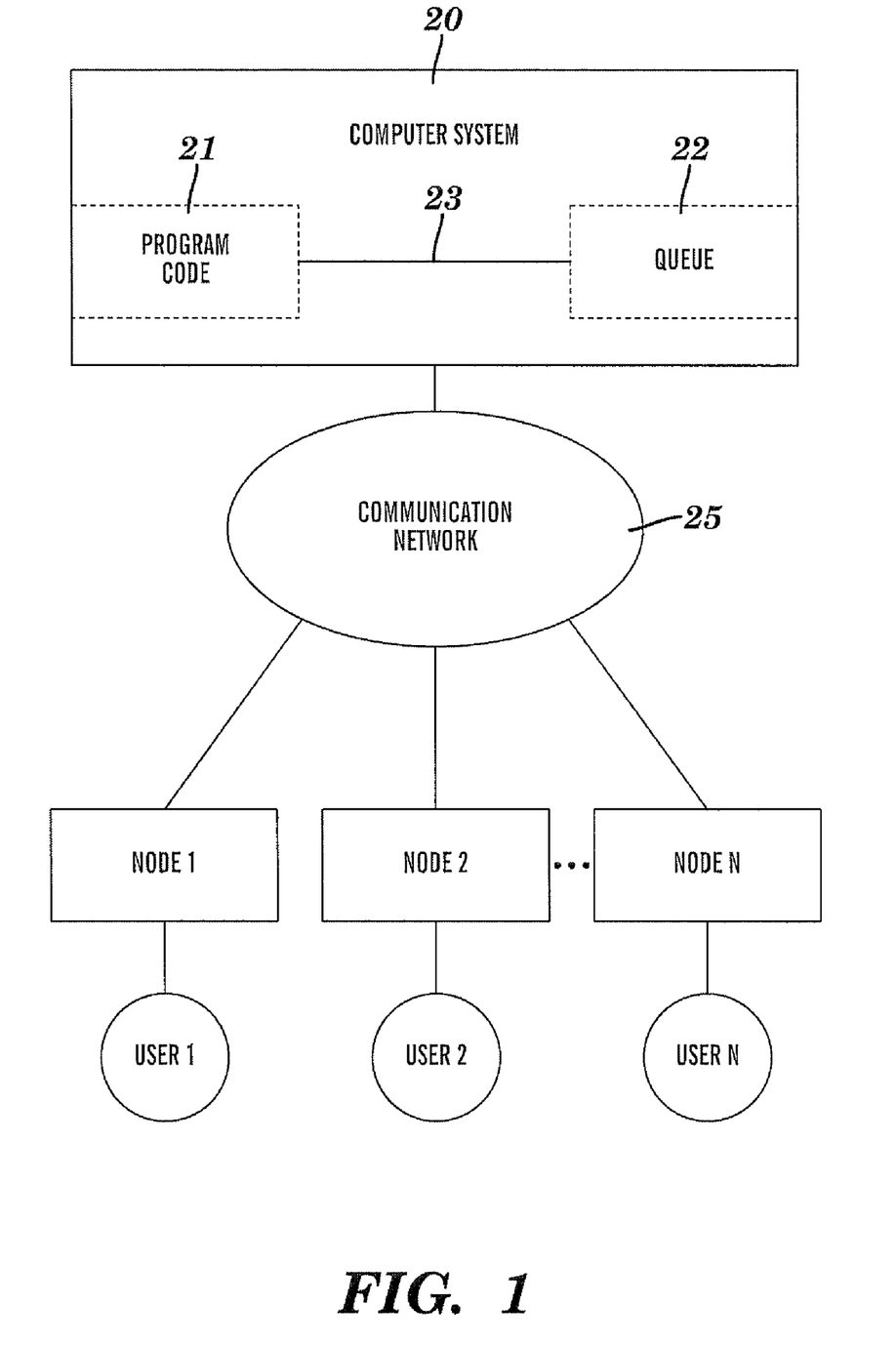
FIG. 1 depicts a communication network to which is coupled a computer system and N nodes (N at least 2), in accordance with embodiments of the present invention.

FIG. 1 depicts a communication network 25 to which is coupled a computer system 20 and N nodes denoted as node 1, node 2, . . . , node N, in accordance with embodiments of the present invention. N is an integer of at least 2.

The communication network 25 may comprise a local area network (LAN), a wide area network (WAN), a public switched telephone network (PSTN), an intranet, the Internet, a cable network operating in the radio-frequency domain and/or the Internet Protocol (IP) domain, a wired network (e.g., using copper), telephone network, packet network, an optical network (e.g., using optical fiber), a wireless network, etc.

The computer system 20 (e.g., the computer system 90 of FIG. 5, described infra) comprises program code 21 and a user control queue 22 (hereinafter, "queue"), wherein the program code 21 is coupled to the queue 22 via connection 23. The program code 21 is configured to be executed on a processor of the computer system 20 to implement a method for managing a remote control session (RCS) in accordance with the present invention. Nodes 1, 2, . . . N each represent a computer, computer system, workstation, etc. N users (denoted as user 1, user 2, . . . , user N) are coupled to the N nodes, so as to have access to the N nodes, on a one-to-one basis; i.e., user I is coupled to node I for I-1, 2, . . . , N. The N users are participants in the RCS and include at least two authorized users and may further include one or more viewers.

During the RCS, control of input mechanisms of the authorized users, for manipulating a shared computer screen (e.g., see FIG. 2 and description thereof infra), is time-sliced among the authorized users such that no more than one authorized user has control of the input mechanisms at each time during the RCS. The shared computer screen may be: an entire screen (e.g., a whole desktop on the screen including all frames superimposed on the desktop), a single frame displayed on the screen, or a plurality of frames displayed on the screen (overlapping and/or non-overlapping frames).

The queue 22 stores the N users, including the at least two authorized users. The queue 22 consists of an ordered sequence of positions. The ordered sequence of positions in the queue are denoted as a first position in the queue, a second position in the queue, . . . , a lowest position in the queue. The first position in the queue is the highest position in the queue. All authorized users who have requested control of the input mechanisms are in contiguous positions of the queue beginning with position 1 of the queue to define an active portion of the queue. All authorized users who have not requested control of the input mechanisms are in contiguous positions of the queue ending with the lowest position of the queue. The program code 21 is configured to provide control of the input mechanisms to only the authorized user in the first position in the queue. A user in the queue, or a user stored in the queue, means herein that an identifier of the user is stored in a position of the ordered sequence of positions in the queue.

A circular upshift of the queue by one or more positions is defined as follows. Assume that the active position of the queue consist of the M positions denoted as $P_1, P_2, \ldots, P_M$ respectively containing M authorized users $U_1, U_2, \ldots, U_M$, wherein M is at least 2. A circular upshift of the queue by one position results in the M positions $P_1, P_2, \ldots, P_M$ of the queue respectively containing authorized users $U_2, \ldots, U_M, U_1$. A circular upshift by two positions would result in the M positions $P_1, P_2, \ldots, P_M$ of the queue respectively containing authorized users $U_3, \ldots, U_M, U_1, U_2$. A circular upshift by K positions would result in the K positions $P_1, P_2, \ldots, P_M$ of the queue respectively containing authorized users $U_{K+1}, \ldots, U_M, U_1, \ldots, U_{K-1}, U_K$.

Inserting an authorized user $U_A$ in the highest position of the queue accompanied by a linear downshift of the remaining active portion of the queue by one position is defined as follows. Assume that the active position of the queue consist of the M positions denoted as $P_1, P_2, \ldots, P_M$ respectively containing M authorized users $U_1, U_2, \ldots, U_M$. Then, inserting the authorized user $U_A$ in the highest position of the queue accompanied by a linear downshift of the queue by one position results in the M+1 positions $P_1, P_2, \ldots, P_M, P_{M+1}$ of the queue respectively containing authorized users $U_A, U_1, U_2, \ldots, U_M$.

Figure 2:
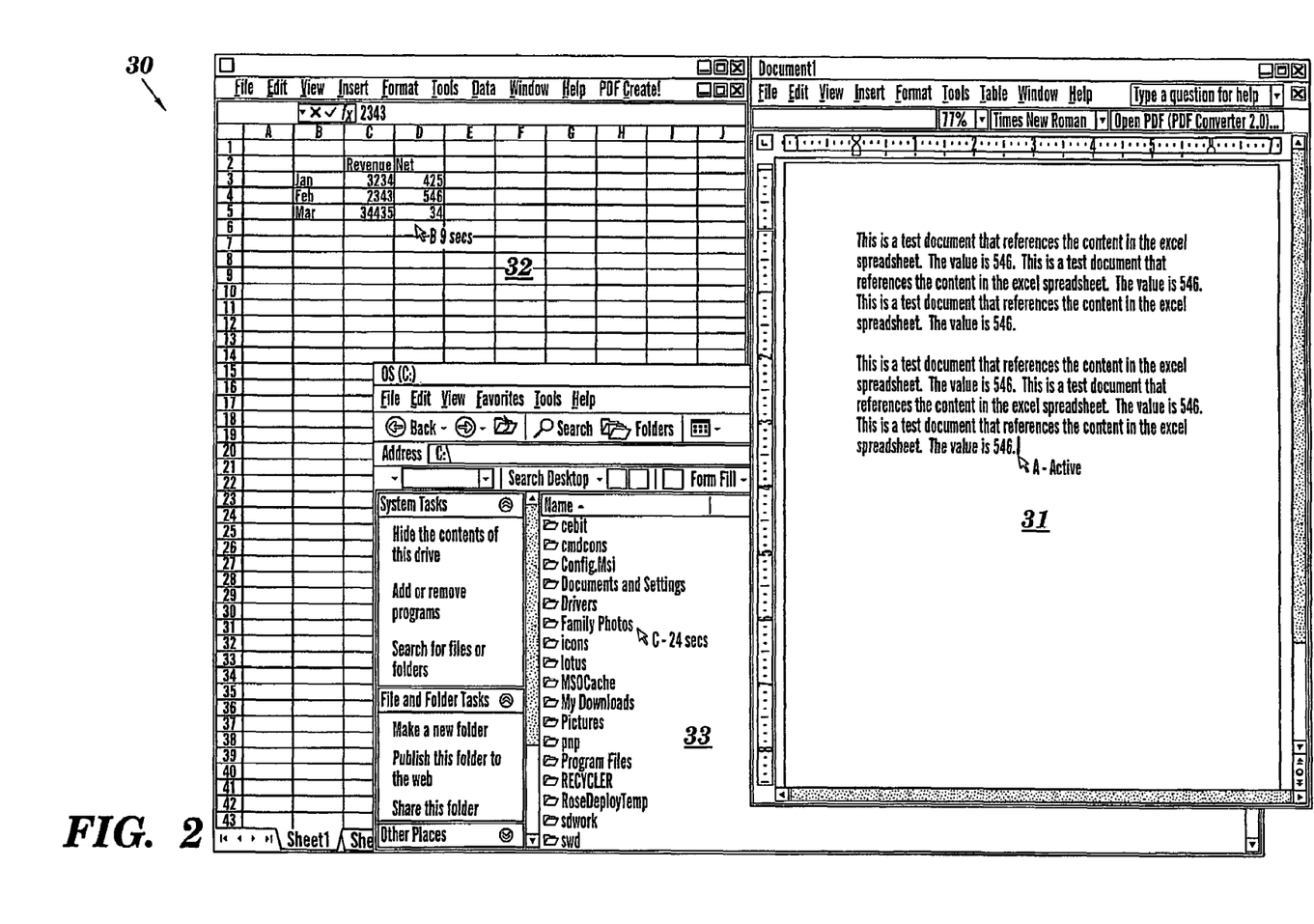
FIG. 2 illustrates a shared computer screen, in accordance with embodiments of the present invention.

FIG. 2 illustrates a shared computer screen 30, in accordance with embodiments of the present invention. In FIG. 2, there are 3 authorized users (A-C) and 5 viewers (D-H) in a RCS. Although the three authorized users (A-C) are sharing the entire screen 30, the three authorized users (A-C) are each using their respective input mechanisms to manipulate a portion of the screen 30. Authorized user A, B, and C, have a highest priority, an intermediate priority, and a lowest priority, respectively, wherein an intermediate priority is a priority that is lower than the highest priority and higher than the lowest priority.

Authorized user A currently has control of the input mechanisms and is manipulating a document 31 via a word processor (i.e., adding text to a paragraph). Authorized user B has requested control of the input mechanisms and desires to make a corresponding logical change to a spreadsheet document 32 and, after taking control of the input mechanisms, moves authorized user B's mouse over to the spreadsheet document 32 and presses the left mouse button over the existing cell on the spreadsheet document 32. Authorized user C has requested control of the input mechanisms, after taking control of the input mechanisms, navigates authorized user C's pointer to a file explorer 33 in an effort to find a related file.

In FIG. 2, "A—Active" indicates that authorized user A currently has control of the input mechanisms, "B 9 secs" indicates that authorized user B is scheduled to have control of the input mechanisms 9 seconds later, and "C 24 secs" indicates that authorized user C is scheduled to have control of the input mechanisms 24 seconds later, which implies that authorized user B is scheduled to have control of the input mechanisms for 15 seconds.

The viewers D-H are each able to view the motion of all input mechanisms of authorized users A-C, and all portions 31-33 of the screen 30, throughout the RCS.

Figure 3:
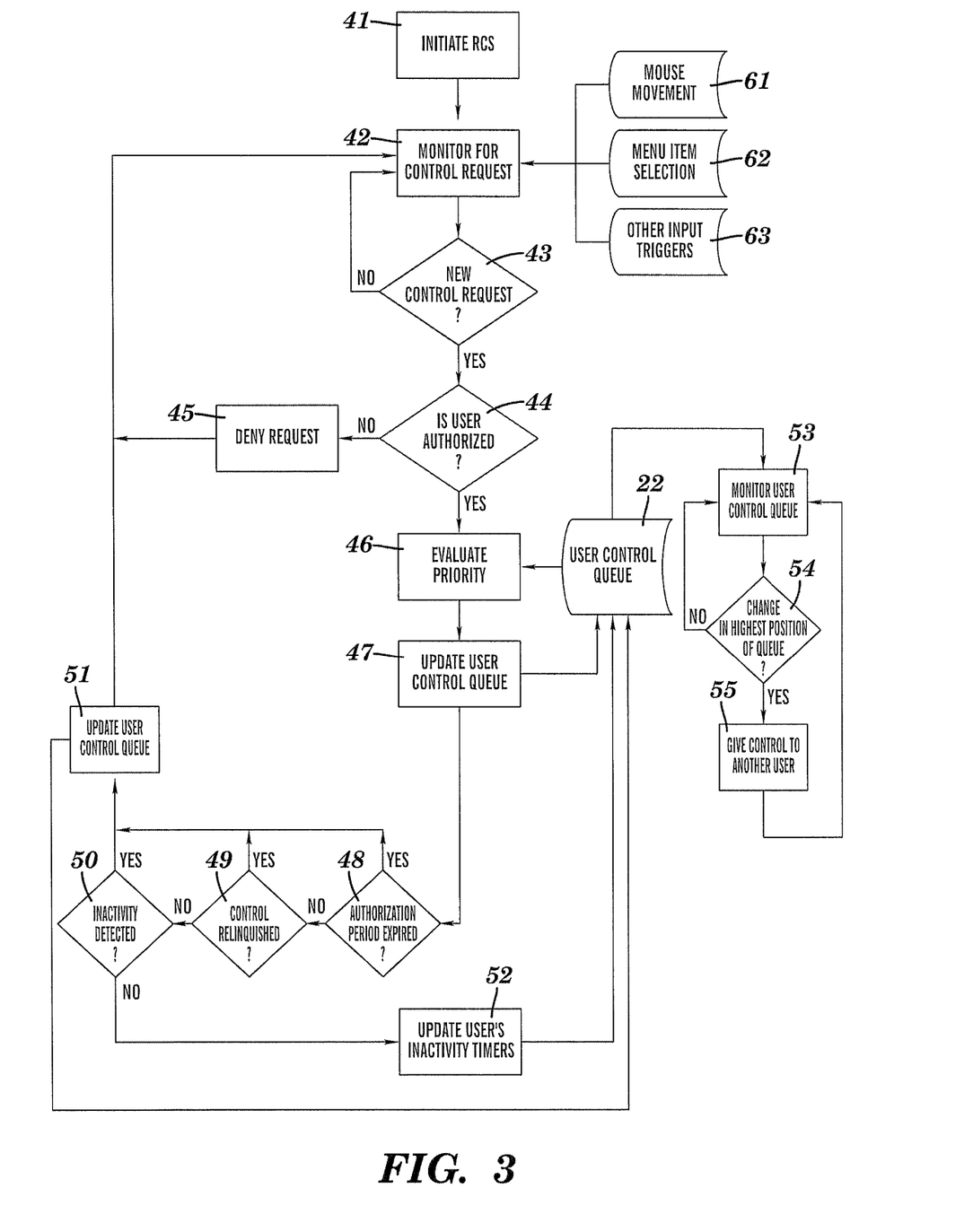
FIG. 3 is a flow chart describing a method for managing a remote control session (RCS), in accordance with embodiments of the present invention.

FIG. 3 is a flow chart describing a method for managing a remote control session (RCS), in accordance with embodiments of the present invention. During the RCS, control of input mechanisms of a plurality of authorized users, for manipulating a shared computer screen, is time-sliced among the authorized users such that no more than one authorized user of the plurality of authorized users has control of the input mechanisms at each time during the RCS. Viewers may also participate in the RCS.

The flow chart of FIG. 3 comprises steps 41-55, which are performed by program code 21 while executing on a processor of the computer system 20 that is coupled to the communication network 25 (see FIG. 1).

In FIG. 3, step 41 begins (i.e., initiates) the RCS during which the authorized users are coupled to the RCS via the communication network 25, wherein each authorized user has been assigned a priority, a control time slice (CTS), and an inactivity threshold, and wherein said initializing comprises enabling each authorized user to view the shared portion of the computer screen throughout the RCS. The CTS is also called an "authorization period". An inactivity timer for each authorized user records and updates an occurrence of a continuous lack of usage of the input mechanism for each authorized user.

In one embodiment, the priority assigned to each authorized user is a same priority. In one embodiment, the priority assigned to each authorized user is variable (e.g., at least two authorized users have a different assigned priority).

In one embodiment, the CTS assigned to each authorized user is a same CTS. In one embodiment, the CTS assigned to each authorized user is variable (e.g., at least two authorized users have a different assigned CTS).

In one embodiment, the inactivity threshold assigned to each authorized user is a same inactivity threshold. In one embodiment, the inactivity threshold assigned to each authorized user is variable (e.g., at least two authorized users have a different assigned inactivity threshold).

In one embodiment, step 40 performs: enabling at least one viewer to view the shared portion of the computer screen throughout the RCS; and establishing controls that prevent each viewer from having control of the input mechanisms during the RCS.

Step 41 includes providing sole control of the input mechanisms to a first authorized user who requested control of the input mechanisms, due to the first authorized user being in the highest position of the queue which may result from updating the queue 22 (e.g., initializing the queue or reorganizing the queue such as by using one or more sort keys). The resultant sole control of the input mechanisms by the first authorized user is configured to be effective for no more than a first duration that is equal to the CTS assigned to the first authorized user.

Step 42 monitors for a request for control of the input mechanisms from a requesting user. The request for control of the input mechanisms may occur while another user (e.g., the first authorized user from step 41 or another user from step 55 discussed infra) has sole control of the input mechanisms.

Step 43 is executed after step 42 detects a request for control of the input mechanisms. Step 43 determines whether the request is a new request from the requesting user (i.e., whether the requester has not previously issued a request for control of the input mechanisms). If step 43 determines that the request is not a new request, then the program code 21 rejects the request and loops back to step 42 to monitor for another request. If step 43 determines that the request is a new request, then step 44 is next executed.

Step 44 determines whether the requesting user is an authorized user, since the only users who may have control of the input mechanisms during the RCS are authorized users. If step 45 determines that the requesting user is not an authorized user, then the program code 21 rejects the request in step 45 and loops back to step 42 to monitor for another such request. In one embodiment, if step 45 determines that the requesting user is an authorized user, then steps 46-47 are next executed. In another embodiment, steps 46-47 are not executed and step 48 is next executed after step 44 determines that the requesting user is an authorized user.

Steps 46-47 are executed in an embodiment in which the priority of the requesting user influences where the requesting user is placed in the queue 22, which determines whether the requesting user's request for control of the input mechanisms is granted or denied. Step 46 evaluates the priority of the requesting user which comprises fetching or otherwise determining the priority of the requesting user and structuring the priority of the requesting user as input to an algorithm that updates the queue 22 in step 47. If step 47 results in the requesting user being placed in the highest position in the queue 22, then the request is granted. If step 47 results in the requesting user being placed in the queue in a position that is not the highest position in the queue 22, then the request is denied.

Exemplary algorithms that may be used to update the queue 22 in step 47 are as follows.

In a first exemplary algorithm that may be used to update the queue 22 in step 47, the updating of the queue 22 inserts the requesting user in the lowest position of the active portion of the queue.

In a second exemplary algorithm that may be used to update the queue 22 in step 47, the priority assigned to the requesting user is higher than the priority assigned to any other authorized user. Then updating the queue comprises inserting the requesting user into the highest position of the queue accompanied by a linear downshift of a remaining active portion of the queue by one position.

In a third exemplary algorithm that may be used to update the queue 22 in step 47, the priority assigned to the requesting user is higher than the priority assigned to the authorized user currently in the highest position of the queue. Then updating the queue comprises inserting the requesting user into the highest position of the queue accompanied by a linear downshift of a remaining active portion of the queue by one position.

In a fourth exemplary algorithm that may be used to update the queue 22 in step 47, the updating of the queue 22 comprises inserting the requesting user into the active portion of the queue (i.e., into any position in the active portion of the queue), followed sorting the active portion of the queue, using the priority assigned to the authorized users in the active portion of the queue as a sort key, to sequentially order the users in the active portion of the queue from the highest position in the queue to the lowest position in the active portion of the queue in a monotonic ordering from higher priority to lower priority.

In a fifth exemplary algorithm that may be used to update the queue 22 in step 47, a control time efficiency (CTE) for each authorized user, as defined infra, is known to the executing program code 21 within the duration during which the authorized user currently in the highest position of the queue has sole control of the input mechanisms. Updating the queue comprises inserting the requesting user into the active portion of the queue (i.e., into any position in the active portion of the queue), followed sorting the active portion of the queue, using the CTE of the authorized users in the active portion of the queue as a sort key, to sequentially order the users in the active portion of the queue from the highest position in the queue to the lowest position in the active portion of the queue in a monotonic ordering from lower CTE to higher CTE.

Control time efficiency (CTE) for each authorized user is defined as follows as illustrated by Tables 1 and 2, described infra.

TABLE 1

| Queue Position | Auth. User | Control Time Weight | Control Time Usage | Control Time Usage Percent | Control Time Target Percent | CTE |
| --- | --- | --- | --- | --- | --- | --- |
| 1 | A | 2 | 200 seconds | 40 | 20 | 200 |
| 2 | B | 4 | 150 seconds | 30 | 40 | 75 |
| 3 | C | 3 | 100 seconds | 20 | 30 | 67 |
| 4 | D | 1 | 50 seconds | 10 | 10 | 100 |

TABLE 2

| Queue Position | Auth. User | CTE |
| --- | --- | --- |
| 1 | C | 67 |
| 2 | B | 75 |
| 3 | D | 100 |
| 4 | A | 200 |

Table 1 depicts a queue whose active portion has four positions (denoted as positions 1, 2, 3, 4) containing four authorized users, namely A, B, C, D, respectively. Each authorized user is assigned a Control Time Weight, which is a relative weight proportional to the intended time of control of the input mechanisms. For example, since users C and B have Control Time Weights of 3 and 4, respectively, the time during the RCS that user C is intended to control the input mechanisms is 75% (i.e., 100×¾) of the time during the RCS that user C is intended to control the input mechanisms. Accordingly, the Control Time Target Percent is computed from the Control Time Weight as a normalized percent. Since the sum of the Control Time Weights over users A, B, C, D is 10, the Control Time Target Percent is 20% for user A (i.e., 2/10), 40% for user B (i.e., 4/10), 30% for user C,(i.e., 3/10) and 10 percent for user D (i.e., 1/10).

The Control Time Usage is the amount of time of control of the input mechanisms for each user from the time of initiation of the RCS to the current time during the RCS, which is 500 seconds in Table 1 (i.e., 200+150+100+50). Accordingly, the Control Time Usage Percent for each user is computed from the Control Time Usage as a normalized percent. Since the sum of the Control Time Usage over users A, B, C, D is 500 seconds (which is equal to the total Control Time Usage for the RCS at the current time during the RCS), the Control Time Usage Percent is 40% for user A (i.e., 200/500), 30% for user B (i.e., 150/500), 20% for user C (i.e., 100/500) and 10% for user D (i.e., 50/500).

CTE is defined as Control Time Usage Percent/Control Time Target Percent for each authorized user. Table 2 results from sorting Table 1, using CTE as a sort key.

Returning to FIG. 3 after step 47 is performed, the program code 21 both performs a first group of steps (i.e., steps 48-50) to test for various conditions as described infra and a second group of steps (i.e., steps 53-55) to monitor for a change in the queue 22 that activates transfer of control of the input mechanisms from the authorized user currently in control of the input mechanisms to anther authorized user that has been placed in the highest position in the queue 22. The first and second group of steps may be performed sequentially (i.e., first group followed by second group or second group followed by first group) or concurrently (e.g., using multiple processors).

Prior to steps 48-50, sole control of the input mechanisms has been to a first authorized user who requested control of the input mechanisms, wherein the sole control of the input mechanisms by the first authorized user is configured to be effective for no more than a first duration (also called first "authorization period") that is equal to the CTS assigned to the first authorized user. Steps 48-50 tests for conditions, and if any of said conditions are satisfied, the queue 22 is updated in step 51 which results in transfer of sole control of the input mechanisms from the first authorized user to a second authorized user who requested control of the input mechanisms, wherein the sole control of the input mechanisms by the second authorized user is configured to be effective for no more than a second duration (also called second "authorization period") that is equal to the CTS assigned to the second authorized user.

In one embodiment in which the second authorized user is in the second position of the queue, the updating of the queue in step 51 comprises performing a circular upshift of the active portion of the queue by one position, resulting in the second authorized user being moved to the first position of the queue and the first authorized user being moved to the lowest position of the queue.

Step 48 tests for an occurrence of an expiration of the first duration (i.e., first authorization period) during which the first authorized user has sole control of the input mechanisms. If step 48 determines that the first authorization period has expired, then step 51 is next executed to update the queue; otherwise step 49 is next executed.

In one embodiment, step 48 determines that the first authorization period has expired and if the first authorized user is the only authorized user in the active portion of the queue, then execution of step 51 will result in the first authorized user regaining immediate control of the input mechanisms for no more than a duration that is equal to the CTS assigned to the first authorized user.

Step 49 tests for a relinquishing of control of the input mechanisms by the first authorized user subject to the relinquishing of control occurring during the first duration while the first authorized user has sole control of the input mechanisms. If step 49 determines that the first authorized user so relinquished of control of the input, then step 51 is next executed to update the queue; otherwise step 50 is next executed. The first authorized user may communicate relinquishment of control of the input mechanisms in any communicable manner such as by: selecting a "relinquishment of control" option in an on-screen menu (e.g., a pop-up menu), dragging a "relinquishment of control" icon to a designated location on the screen, etc.

Step 50 tests for an occurrence of a continuous lack of usage of the input mechanisms by the first authorized user for a time interval exceeding the inactivity threshold assigned to the first authorized user, subject to the continuous lack of usage occurring during the first duration while the first authorized user has sole control of the input mechanisms. If step 50 determines that said continuous lack of usage of the input mechanisms by the first authorized user has so occurred, then step 51 is next executed to update the queue; otherwise step 52 is next executed.

Although steps 48-50 are depicted in FIG. 3 as being performed in the sequential order of steps 48, 49, and step 50, the scope of the present invention comprises performing steps 48-50 in any in sequential order (i.e., steps 48, 49, 50; steps 48, 50, 49; steps 49, 48, 50; steps 49, 50, 48; steps 50, 48, 49; steps 50, 49, 48).

Step 52 updates the activity timer of the first authorized user who is currently in control of the input mechanisms. After step 52 is performed, the group of steps 53-55 is next performed.

In response to any one condition of the conditions tested for in steps 48-50 being satisfied, step 51 updates the queue 22. Exemplary algorithms that may be used to update the queue 22 in step 51 are discussed infra. As a result of updating the queue in step 51, sole control of the input mechanisms is transferred from the first authorized user to a second authorized user who requested control of the input mechanisms, wherein the sole control of the input mechanisms by the second authorized user is configured to be effective for no more than a second duration (also called second "authorization period") that is equal to the CTS assigned to the second authorized user.

After step 51 is performed, the program code 21 both performs a first group of steps (i.e., steps 42-44) to monitor for another request and a second group of steps (i.e., steps 53-55) to monitor for a change in the queue 22 that activates transfer of control of the input mechanisms from the authorized user currently in control of the input mechanisms to anther authorized user that has been placed in the highest position in the queue 22. The first and second group of steps may be performed sequentially (i.e., first group followed by second group or second group followed by first group) or concurrently (e.g., using multiple processors).

Step 53 monitors the queue 22 so that step 54 may determine whether a change in the queue has occurred such that the authorized user in the highest position in the queue differs from the authorized user currently in control of the input mechanisms. If step 54 determines that said change in the queue has not occurred then the program code 21 loops back to step 53. If step 54 determines that said change in the queue has occurred then step 55 is next executed.

Step 55 transfers control of the input mechanisms to another authorized user, namely the authorized user that is currently in the highest position in the queue. After step 55 is performed, the program code 21 loops back to step 53.

Figure 4:
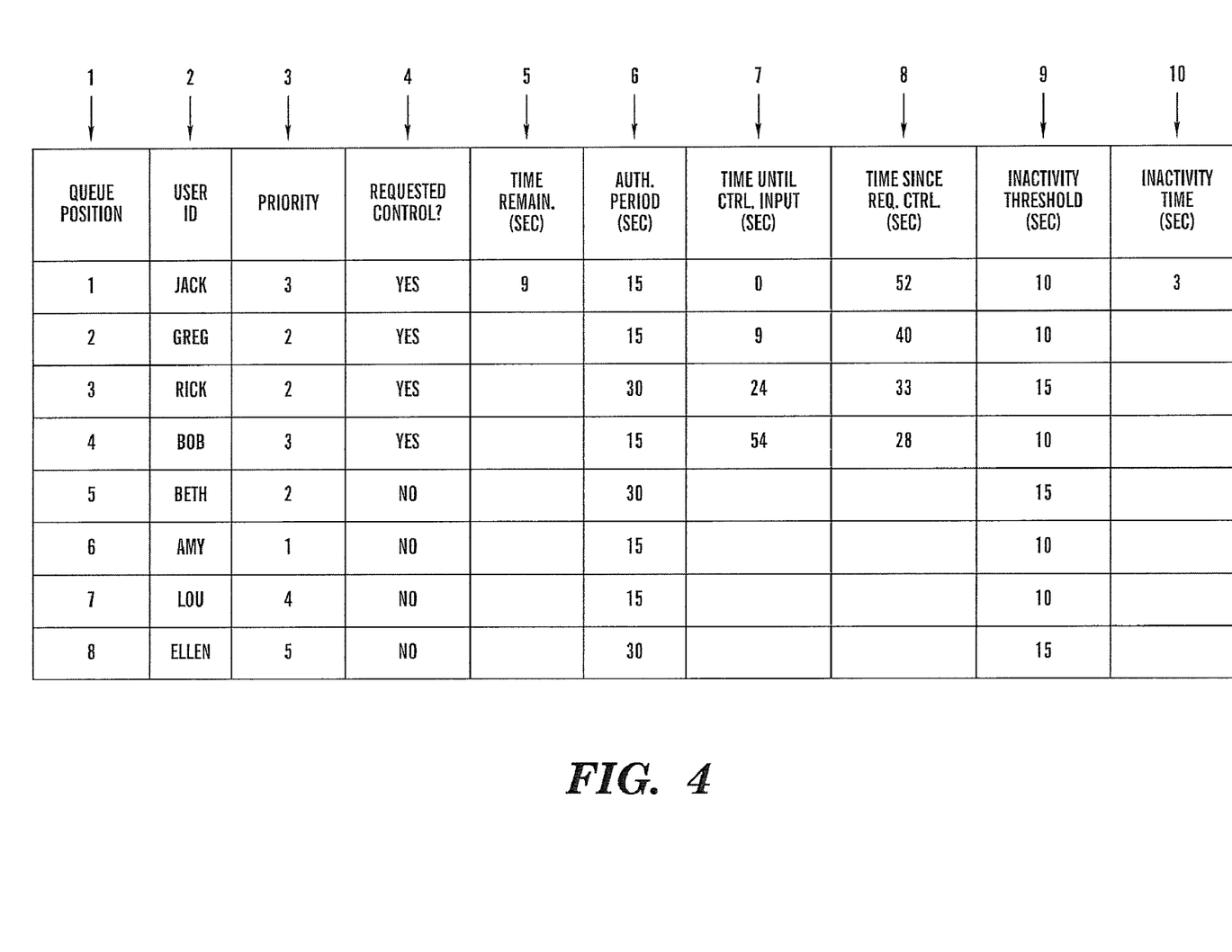
FIG. 4 depicts an exemplary table describing a queue, in accordance with embodiments of the present invention.

FIG. 4 depicts an exemplary table describing a queue, in accordance with embodiments of the present invention. The table in FIG. 4 comprises columns 1-10 and 8 rows such that each row of the 8 rows represents a different authorized user in the queue. Column 1 specifies queue position of the authorized user. Column 2 specifies a user identifier (ID) that identifies the authorized user. Column 3 specifies the priority of the authorized user. Column 4 specifies whether the authorized user has requested control of the input mechanisms. Note that the users in queue positions 1-4 have requested control of the input mechanisms, whereas the users in queue positions 5-8 have not requested control of the input mechanisms. Therefore, the active portion of the queue consists of queue positions 1-4.

Column 5 specifies the time remaining for the authorized user in position 1 of the queue to be in control of the input mechanisms until the authorization period of the authorized user in position 1 of the queue expires. Column 6 specifies the authorization period (i.e., the CTS) of the authorized user. Column 7 specifies the time until the authorized user is scheduled to obtain control of the input mechanisms (applies only to authorized user in the active portion of the queue). Column 8 specifies the amount of time elapsed since the authorized user requested control of the input mechanisms. Column 9 specifies the inactivity threshold of the authorized user. Column 10 specifies the inactivity time of the authorized user in position 1 of the queue. In one embodiment, the authorized users would have dynamic access to the table in FIG. 4, such as by representing the table in FIG. 4 as an icon that can be minimize by the authorized user or activated to be displayed in a window by the authorized user.

In one embodiment, there is a user interface available to each authorized user to enable each authorized user to determine which authorized user has current control of the input mechanisms and which authorized user is in queue position 2 and thus will next gain control of the input mechanisms if any of the conditions of steps 48-50 in FIG. 3 are satisfied. In one embodiment, this interface includes a count-down timer that appears next to an input mechanism (e.g., pointer) of each authorized user. This countdown timer is depicted in col. 7 of the table in FIG. 4.

In one embodiment, an authorized user may be in position 2 of the queue, but may decide to give the authorized user in a lower position of the queue (e.g., position 3 of the queue) the option of swapping positions in the queue with the authorized user in position 2 of the queue. This embodiment may be used, inter alia, when there is a side communications channel between authorized users, such as a voice conference call or instant messaging session underway. Implementation of this embodiment would involve an additional element within the RCS to make these manual adjustments to control (e.g., a file pull down menu, a right click action, a display of the current queuing order and subsequent reordering of that queuing order, etc.)

Figure 5:
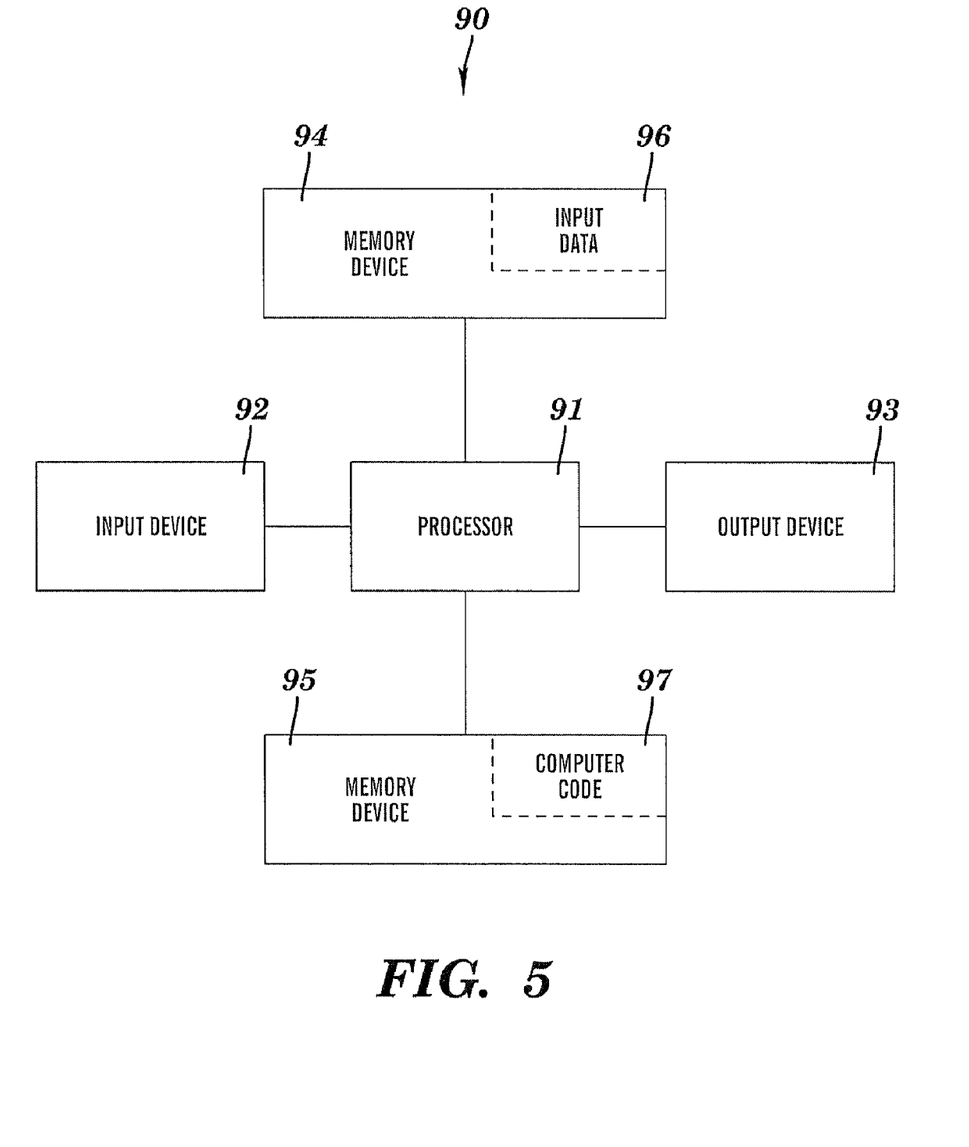
FIG. 5 illustrates a computer system used for managing a remote control session, in accordance with embodiments of the present invention

FIG. 5 illustrates a computer system 90 used for managing a remote control session (RCS), in accordance with embodiments of the present invention. The computer system 90, which may be used for the computer system 20 of FIG. 1, comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises computer-executable instructions. The computer code 97 includes an algorithm for managing a remote control session (RCS). The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

The present invention discloses a process for deploying or integrating computing infrastructure, comprising integrating computer-readable code into the computer system 90, wherein the code in combination with the computer system 90 is capable of performing a method for managing a remote control session (RCS). Any of the components of the present invention could be deployed, managed, serviced, etc. by a service provider.

In another embodiment, the invention provides a business method that performs the process steps of the invention on a subscription, advertising, and/or fee basis. That is, a service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

What is claimed is:

1. A method for managing a remote control session (RCS) during which control of input mechanisms of a plurality of authorized users for manipulating a shared computer screen is time-sliced among the authorized users such that no more than one authorized user of the plurality of authorized users has control of the input mechanisms at each time during the RCS, said method comprising:

initiating the RCS during which the authorized users are coupled to the RCS via a communication network, wherein each authorized user has been assigned a priority, a control time slice (CTS), and an inactivity threshold, and wherein said initializing comprises enabling each authorized user to view a shared portion of the computer screen throughout the RCS;

providing sole control of the input mechanisms to a first authorized user who requested control of the input mechanisms, wherein the sole control of the input mechanisms by the first authorized user is configured to be effective for no more than a first duration that is equal to the CTS assigned to the first authorized user;

transferring sole control of the input mechanisms from the first authorized user to a second authorized user who requested control of the input mechanisms, wherein the sole control of the input mechanisms by the second authorized user is configured to be effective for no more than a second duration that is equal to the CTS assigned to the second authorized user, wherein said initiating the RCS, said transferring sole control of the input mechanisms to the first authorized user, and said transferring sole control of the input mechanisms to the second authorized user are performed by program code while executing on a processor of a computer system that is coupled to the communication network, wherein the plurality of authorized users are in a queue, wherein the queue consists of an ordered sequence of positions, wherein the ordered sequence of positions in the queue are denoted as a first position in the queue, a second position in the queue, . . . , a lowest position in the queue, wherein the first position in the queue is the highest position in the queue, wherein all authorized users who have requested control of the input mechanisms are in contiguous positions of the queue beginning with first position of the queue to define an active portion of the queue, wherein all authorized users who have not requested control of the input mechanisms are in contiguous positions of the queue ending with the lowest position of the queue, and wherein the program code is configured to provide control of the input mechanisms to only the authorized user in the first position in the queue;

updating the queue at a first time, resulting in the first authorized user being in the highest position of the queue, wherein said transferring sole control of the input mechanisms to the first authorized user is performed in response to said updating the queue at the first time; and updating the queue at a second time, resulting in the second authorized user being in the first position of the queue, wherein said transferring sole control of the input mechanisms from the first authorized user to the second authorized user is performed in response to updating the queue at the second time, and wherein said updating the queue at the first time and said updating the queue at the second time are performed by the executing program code.

2. The method of claim 1, wherein the method further comprises:
   detecting, by the executing program code, a condition prior to the second time, wherein the condition is selected from the group consisting of a first condition, a second condition, and a third condition,
   wherein said updating the queue at the second time is performed in response to said detecting the condition,
   wherein the first condition comprises an expiration of the first duration during which the first authorized user has sole control of the input mechanisms,
   wherein the second condition comprises a continuous lack of usage of the input mechanisms by the first authorized user for a time interval exceeding the inactivity threshold assigned to the first authorized user subject to the continuous lack of usage occurring during the first duration while the first authorized user has sole control of the input mechanisms,
   wherein the third condition comprises a relinquishing of control of the input mechanisms by the first authorized user subject to the relinquishing of control occurring during the first duration while the first authorized user has sole control of the input mechanisms.

3. The method of claim 2, wherein the condition is the first condition.

4. The method of claim 2, wherein the condition is the second condition.

5. The method of claim 2, wherein the condition is the third condition.

6. The method of claim 2, wherein the second authorized user is in the second position of the queue when said condition is detected prior to said updating the queue at the second time, and wherein said updating the queue at the second time comprises performing a circular upshift of the active portion of the queue by one position, resulting in the second authorized user being moved to the first position of the queue and the first authorized user being moved to the lowest position of the active portion of the queue.

7. The method of claim 1, wherein the method further comprises:
   detecting a request for control of the input mechanisms from a third authorized user that has not previously issued the request for control, wherein the request for control occurs within the second duration while the second authorized user has sole control of the input mechanisms; and
   updating the queue at a third time in response to said detecting the request for control.

8. The method of claim 7, wherein said updating the queue at the third time comprises inserting the third authorized user in the lowest position of the active portion of the queue.

9. The method of claim 7, wherein the priority assigned to the third authorized user is higher than the priority assigned to any other authorized user, and wherein said updating the queue at the third time comprises inserting the third authorized user in the highest position of the queue accompanied by a linear downshift of a remaining active portion of the queue by one position.

10. The method of claim 7, wherein the priority assigned to the third authorized user is higher than the priority assigned to the second authorized user, and wherein said updating the queue at the third time comprises inserting the third authorized user in the highest position of the queue accompanied by a linear downshift of a remaining active portion of the queue by one position.

11. The method of claim 7, wherein said updating the queue at the third time comprises:
   inserting the third authorized user in the active portion of the queue; and
   after said inserting, sorting the active portion of the queue, using the priority assigned to the authorized users in the active portion of the queue as a sort key, to sequentially order the users in the active portion of the queue from the highest position in the queue to the lowest position in the active portion of the queue in a monotonic ordering from higher priority to lower priority.

12. The method of claim 7, wherein a control time efficiency (CTE) for each authorized user is known to the executing program code within the second duration during which the second authorized user has sole control of the input mechanisms, and wherein said updating the queue at the third time comprises:
   inserting the third authorized user in the active portion of the queue; and
   after said inserting, sorting the active portion of the queue comprising the third authorized user, using the CTE of the authorized users in the active portion of the queue as a sort key, to order the users in the active portion of the queue from the highest position in the queue to the lowest position in the active portion of the queue in a monotonic ordering from lower CTE to higher CTE.

13. The method of claim 1, wherein the CTS assigned to each authorized user is a same CTS.

14. The method of claim 1, wherein at least two authorized users have a different assigned CTS.

15. The method of claim 1, wherein the inactivity threshold assigned to each authorized user is a same inactivity threshold.

16. The method of claim 1, wherein at least two authorized users have a different assigned inactivity threshold.

17. The method of claim 1, wherein said initializing further comprises:
   enabling at least one viewer to view the shared portion of the computer screen throughout the RCS; and
   establishing controls that prevent each viewer from having control of the input mechanisms during the RCS.

18. A computer program product, comprising a computer usable medium having a computer readable program code embodied therein, said computer readable program code containing instructions that implement the method of claim 1 when executed by the processor of the computer system.

19. A computing system, comprising a computer readable memory unit containing instructions that implement the method of claim 1 when the instructions are executed by the processor of the computer system, wherein the computing system comprises the computer system and the computer system comprises the computer readable memory unit.

20. A process for integrating computing infrastructure, said process comprising integrating computer-readable code into a computer system that is coupled to a communication network, wherein the code in combination with the computer system is capable of performing a method for managing a remote control session (RCS) during which control of input mechanisms of a plurality of authorized users for manipulating a shared computer screen is time-sliced among the authorized users such that no more than one authorized user of the plurality of authorized users has control of the input mechanisms at each time during the RCS, said method comprising:

initiating the ROS during which the authorized users are coupled to the RCS via a communication network, wherein each authorized user has been assigned a priority, a control time slice (CTS), and an inactivity threshold, and wherein said initializing comprises enabling each authorized user to view a shared portion of the computer screen throughout the RCS;

providing sole control of the input mechanisms to a first authorized user who requested control of the input mechanisms, wherein the sole control of the input mechanisms by the first authorized user is configured to be effective for no more than a first duration that is equal to the CTS assigned to the first authorized user;

transferring sole control of the input mechanisms from the first authorized user to a second authorized user who requested control of the input mechanisms, wherein the sole control of the input mechanisms by the second authorized user is configured to be effective for no more than a second duration that is equal to the CTS assigned to the second authorized user, wherein said initiating the RCS, said transferring sole control of the input mechanisms to the first authorized user, and said transferring sole control of the input mechanisms to the second authorized user are performed by program code while executing on a processor of the computer system, wherein the plurality of authorized users are in a queue, wherein the queue consists of an ordered sequence of positions, wherein the ordered sequence of positions in the queue are denoted as a first position in the queue, a second position in the queue, . . . , a lowest position in the queue, wherein the first position in the queue is the highest position in the queue, wherein all authorized users who have requested control of the input mechanisms are in contiguous positions of the queue beginning with first position of the queue to define an active portion of the queue, wherein all authorized users who have not requested control of the input mechanisms are in contiguous positions of the queue ending with the lowest position of the queue, and wherein the program code is configured to provide control of the input mechanisms to only the authorized user in the first position in the queue;

updating the queue at a first time, resulting in the first authorized user being in the highest position of the queue, wherein said transferring sole control of the input mechanisms to the first authorized user is performed in response to said updating the queue at the first time; and updating the queue at a second time, resulting in the second authorized user being in the first position of the queue, wherein said transferring sole control of the input mechanisms from the first authorized user to the second authorized user is performed in response to updating the queue at the second time, and wherein said updating the queue at the first time and said updating the queue at the second time are performed by the executing program code.

21. The process of claim 20, wherein the method further comprises:

detecting, by the executing program code, a condition prior to the second time, wherein the condition is selected from the group consisting of a first condition, a second condition, and a third condition, wherein said updating the queue at the second time is performed in response to said detecting the condition, wherein the first condition comprises an expiration of the first duration during which the first authorized user has sole control of the input mechanisms, wherein the second condition comprises a continuous lack of usage of the input mechanisms by the first authorized user for a time interval exceeding the inactivity threshold assigned to the first authorized user subject to the continuous lack of usage occurring during the first duration while the first authorized user has sole control of the input mechanisms, wherein the third condition comprises a relinquishing of control of the input mechanisms by the first authorized user subject to the relinquishing of control occurring during the first duration while the first authorized user has sole control of the input mechanisms.

22. The process of claim 21, wherein the condition is the first condition.

23. The process of claim 21, wherein the condition is the second condition.

24. The process of claim 21, wherein the condition is the third condition.

25. The process of claim 21, wherein the second authorized user is in the second position of the queue when said condition is detected prior to said updating the queue at the second time, and wherein said updating the queue at the second time comprises performing a circular upshift of the active portion of the queue by one position, resulting in the second authorized user being moved to the first position of the queue and the first authorized user being moved to the lowest position of the active portion of the queue.

26. The process of claim 20, wherein the method further comprises:

detecting a request for control of the input mechanisms from a third authorized user that has not previously issued the request for control, wherein the request for control occurs within the second duration while the second authorized user has sole control of the input mechanisms; and updating the queue at a third time in response to said detecting the request for control.

27. The process of claim 26, wherein said updating the queue at the third time comprises inserting the third authorized user in the lowest position of the active portion of the queue.

28. The process of claim 26, wherein the priority assigned to the third authorized user is higher than the priority assigned to any other authorized user, and wherein said updating the queue at the third time comprises inserting the third authorized user in the highest position of the queue accompanied by a linear downshift of a remaining active portion of the queue by one position.

29. The process of claim 26, wherein the priority assigned to the third authorized user is higher than the priority assigned to the second authorized user, and wherein said updating the queue at the third time comprises inserting the third authorized user in the highest position of the queue accompanied by a linear downshift of a remaining active portion of the queue by one position.

30. The process of claim 26, wherein said updating the queue at the third time comprises:

inserting the third authorized user in the active portion of the queue; and after said inserting, sorting the active portion of the queue, using the priority assigned to the authorized users in the active portion of the queue as a sort key, to sequentially order the users in the active portion of the queue from the highest position in the queue to the lowest position in the active portion of the queue in a monotonic ordering from higher priority to lower priority.

31. The process of claim 26, wherein a control time efficiency (CTE) for each authorized user is known to the executing program code within the second duration during which the second authorized user has sole control of the input mechanisms, and wherein said updating the queue at the third time comprises:

inserting the third authorized user in the active portion of the queue; and after said inserting, sorting the active portion of the queue comprising the third authorized user, using the CTE of the authorized users in the active portion of the queue as a sort key, to order the users in the active portion of the queue from the highest position in the queue to the lowest position in the active portion of the queue in a monotonic ordering from lower CTE to higher CTE.

32. The process of claim 20, wherein said initializing further comprises:

enabling at least one viewer to view the shared portion of the computer screen throughout the RCS; and establishing controls that prevent each viewer from having control of the input mechanisms during the RCS.

* * * * *